(12) United States Patent
Vincent

(10) Patent No.: US 9,292,466 B1
(45) Date of Patent: Mar. 22, 2016

(54) TRAFFIC CONTROL FOR PRIORITIZED VIRTUAL MACHINES

(75) Inventor: Pradeep Vincent, Kenmore, WA (US)

(73) Assignee: Amazon Technologies, Inc., Reno, NV (US)

(*) Notice: Subject to any disclaimer, the term of this patent is extended or adjusted under 35 U.S.C. 154(b) by 488 days.

(21) Appl. No.: 12/980,075

(22) Filed: Dec. 28, 2010

(51) Int. Cl.
*G06F 15/16* (2006.01)

(52) U.S. Cl.
CPC .................................. *G06F 15/16* (2013.01)

(58) Field of Classification Search
USPC .......................................................... 370/235
See application file for complete search history.

(56) References Cited

U.S. PATENT DOCUMENTS

| | | | |
|---|---|---|---|
| 7,860,120 B1 * | 12/2010 | Wang et al. | 370/418 |
| 2002/0083357 A1 * | 6/2002 | McGowan et al. | 713/323 |
| 2006/0064697 A1 * | 3/2006 | Kagi et al. | 718/103 |
| 2006/0109864 A1 * | 5/2006 | Oksman | 370/474 |
| 2006/0251090 A1 * | 11/2006 | Jones | 370/412 |
| 2008/0126580 A1 * | 5/2008 | Tripathi et al. | 710/5 |
| 2011/0261814 A1 * | 10/2011 | Matthews et al. | 370/389 |

* cited by examiner

*Primary Examiner* — Sulaiman Nooristany
(74) *Attorney, Agent, or Firm* — Hogan Lovells US LLP

(57) ABSTRACT

Information about the transmission of packets or other information can be inferred based at least in part upon the state of one or more queues used to transmit that information. In a networking example, a hook can be added to a free buffer API call from a queue of a NIC driver. When a packet is transmitted and a buffer freed, the hook can cause information for that packet to be transmitted to an appropriate location, such as a network traffic control component or control plane component, whereby that information can be compared with packet, source, and other such information to infer which packets have been transmitted, which packets are pending, and other such information. This information can be used for various purposes, such as to dynamically adjust the allocation of a resource (e.g., a NIC) to various sources based at least in part upon the monitored behavior.

25 Claims, 6 Drawing Sheets

_US 9,292,466 B1_

TRAFFIC CONTROL FOR PRIORITIZED VIRTUAL MACHINES

BACKGROUND

As an increasing number of applications and services are being made available over networks such as the Internet, and as an increasing amount of data is being stored remotely, an increasing number of content, application, and/or service providers are turning to centralized or shared resource technologies, such as cloud computing and data warehousing. As the amount of traffic increases, there is a corresponding need to increase the capacity of these shared resources and also improve the efficiency of data transmission.

In a shared environment, such as a multi-tenant environment where there can be multiple virtual machines running on a common set of hardware components, it is often the case that there is a significant amount of contention for one or more of these components. For example, there might be multiple virtual machines sharing a common network interface card (NIC). In many conventional systems, access to a component such as a NIC relies upon a "fairness" approach among peers, wherein each virtual machine will "play fair" and utilize at most its fair share of the capacity of the NIC, as well as any queues or buffers utilized by, or in conjunction with, the NIC. A virtual machine or other component unfairly consuming a disproportionate amount of this capacity can negatively impact other peers sharing that resource. Once way to constrain these peers in conventional systems is to throttle the throughput, such that any virtual machine or other such component cannot exceed a certain data rate even if there is available capacity of the resource. Even if the bandwidth or throughput is divided relatively evenly between peers, however, the additional latency introduced by one peer misbehaving might be too much for another peer to handle. For example, even in the presence of network throughput throttling, a peer performing an action such as a large file transfer can cause the performance of the system to slow down, which can increase latency experienced by other peers sharing that hardware.

BRIEF DESCRIPTION OF THE DRAWINGS

Various embodiments in accordance with the present disclosure will be described with reference to the drawings, in which.

DETAILED DESCRIPTION

Figure 1:
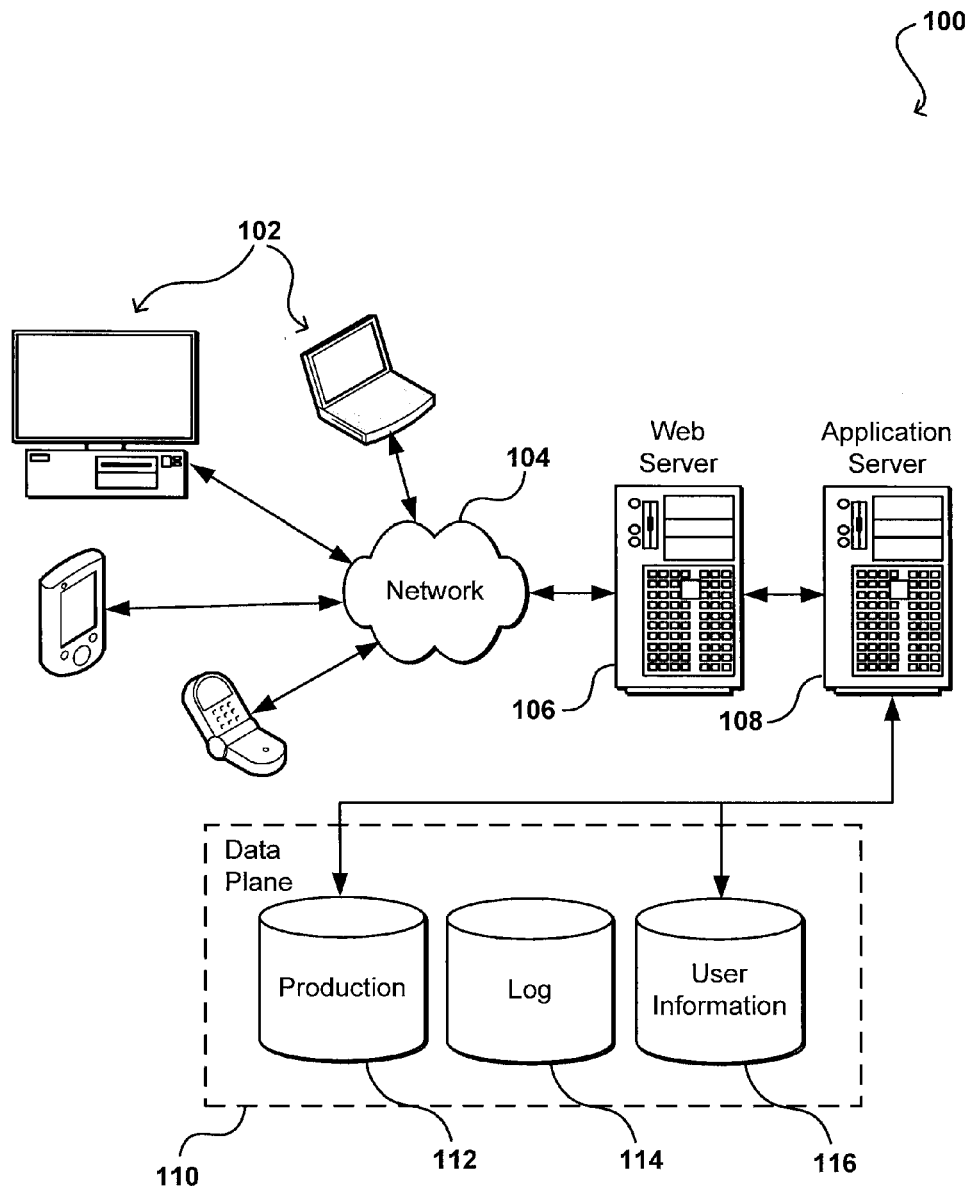
FIG. 1 illustrates an environment in which various embodiments can be implemented.

Systems and methods in accordance with various embodiments of the present disclosure may overcome one or more of the aforementioned and other deficiencies experienced in conventional approaches to managing data and/or resources in a networked environment. In particular, various embodiments provide for improvements in prioritization, fairness, and/or other such aspects, as may relate to factors such as latency and throughput for shared resources. In some embodiments, the resources can be shared by peers (e.g., virtual machines) in a multi-tenant environment, while in other embodiments the resources can be shared by applications, threads, or processes in a general operating system, etc. Intelligent network traffic control software can be provided that is able to improve network latency performance and decrease cross-tenant latency impact in a virtualized environment, even if specific network components are unable to provide appropriate quality of service (QoS) or latency guarantees.

In various embodiments, packets or other information to be handled and/or processed by a shared resource will be buffered in at least one queue. Even though the resource might not provide an acknowledgement when the information is handled or processed, the fact that the packet or information is no longer buffered in a given queue can be used to infer that the packet has been processed. By combining this information with information about the packets, such as the source of the packets and time the packets were sent, systems and methods in accordance with various embodiments can monitor the state of various packets, such as how many packets are pending and for how long, as well as information such as the behavior of each source of the packets. This information can be used to dynamically adjust the behavior of the system, such as to throttle various sources or adjust the allocation of a shared resource across those sources.

In one embodiment where multiple virtual machines (VMs) share a network interface card (NIC), a hook can be added to call for a queue of a NIC driver such that the system can determine when packets from a given VM are passed to the NIC, as the buffer holding a given packet is now empty (or at least has freed up space previously occupied by that packet). Such information can be used to infer that a packet from a VM has been transmitted, even where an acknowledgement will not otherwise be provided to the network I/O stack. The information about the transmission can be combined with information such as the time of receipt of the packet from a VM and the identity of the VM sending the packet to monitor information such as the number and/or frequency of packets sent by a given VM, as well as the amount of time needed for the packets to be transmitted, the size of those packets, etc. The behavior can be used to adjust allocation of the queue, such as by adjusting a number of bytes and/or packets of data that the VM can have buffered at any given time.

Various other functionality can be provided for these and other protocols and purposes within the scope of the various embodiments as described and suggested elsewhere herein, and as would be apparent to one of ordinary skill in the art reading the same.

FIG. 1 illustrates an example of an environment 100 for implementing aspects in accordance with various embodiments. As will be appreciated, although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing log data 114, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

A shared resource management system can include at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
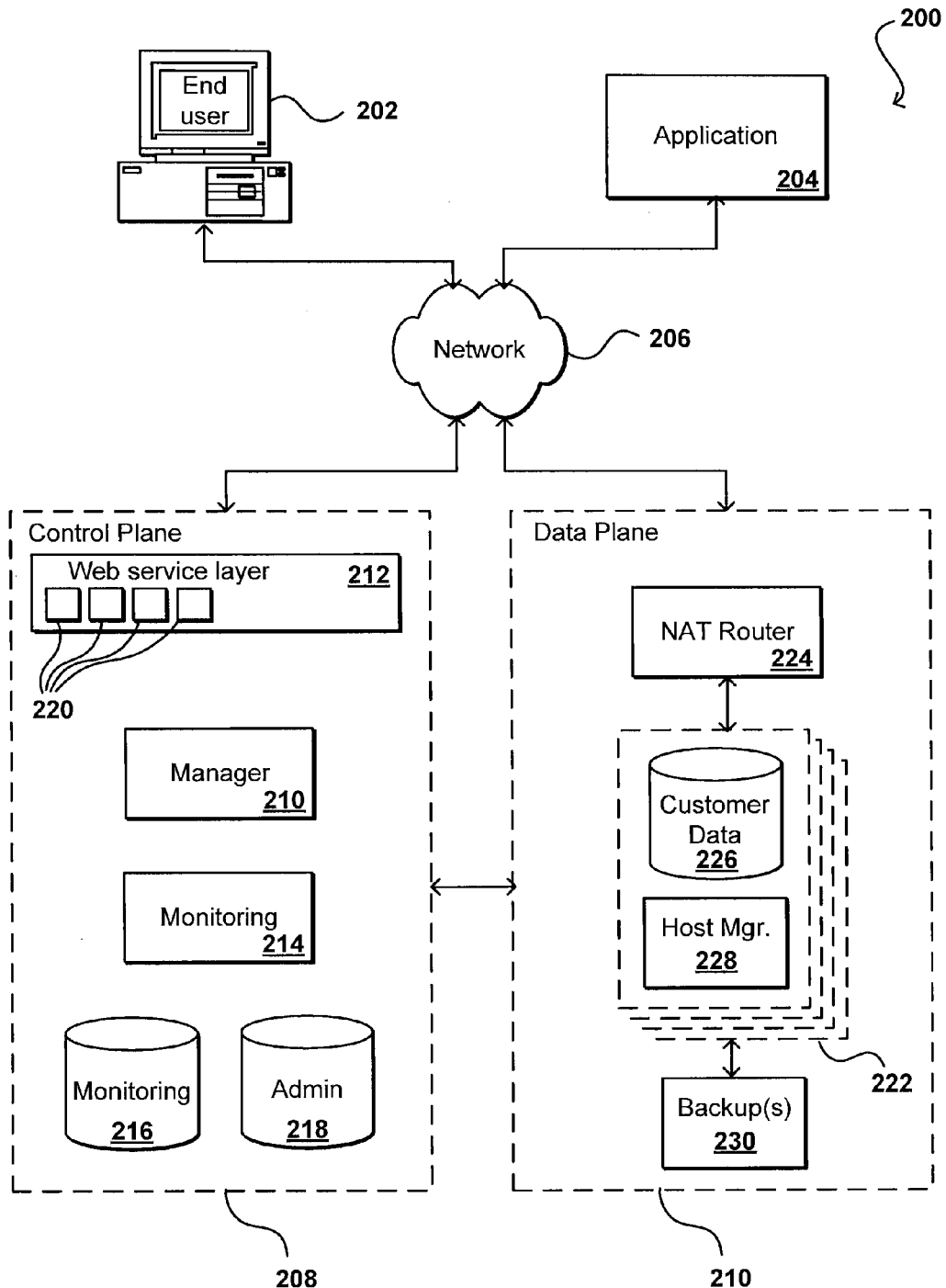
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching an IP address (derived from DNS mappings) or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port address to be used to access a resource. A user then can access the resource directly using the IP address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

Figure 3:
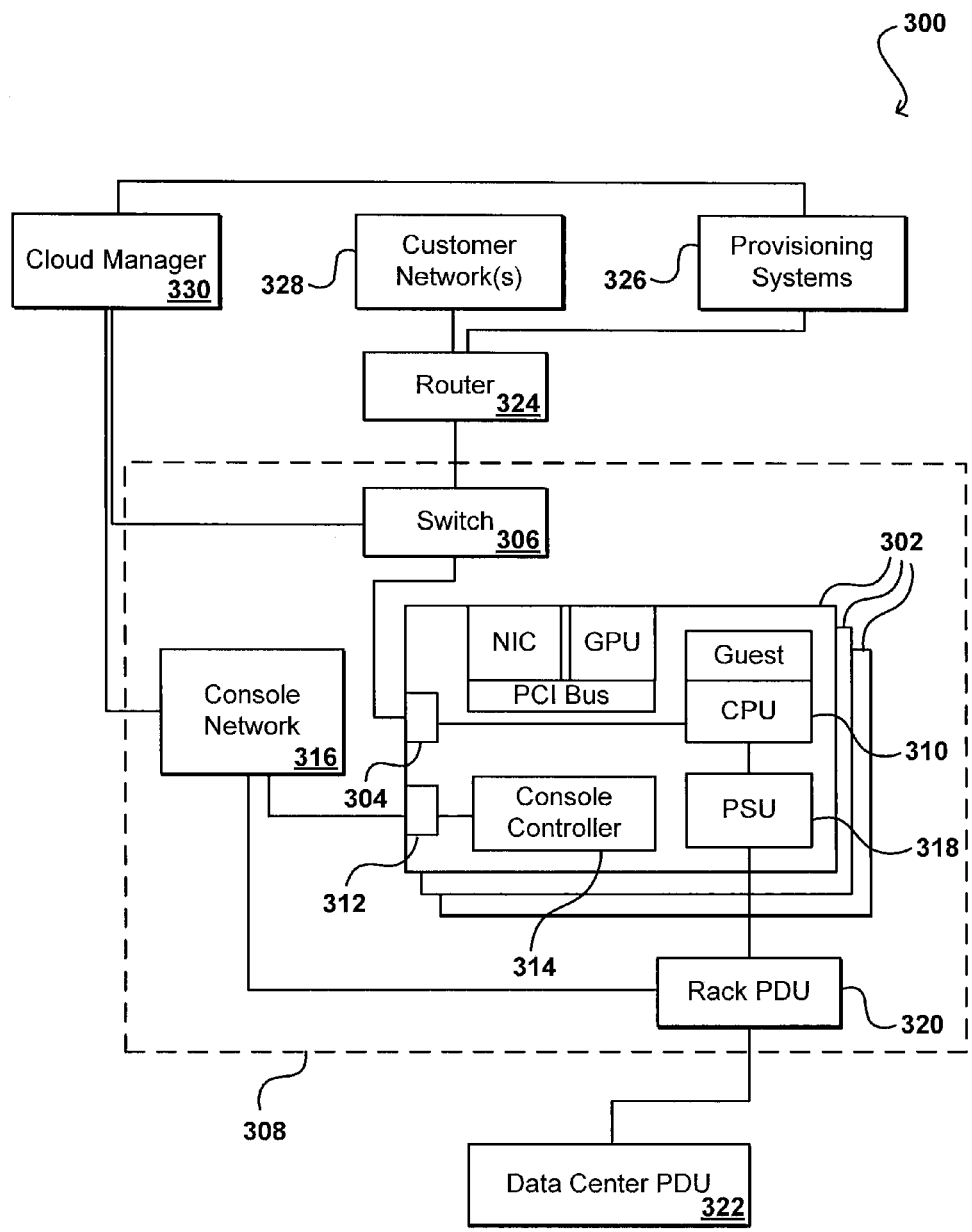
FIG. 3 illustrates a configuration for routing network traffic using specific hardware resources that can be used in accordance with one embodiment.

FIG. 3 illustrates an example of a configuration 300 that can be used to provide one or more customers, applications, or other such entities with access to a resource in a shared environment. This example configuration includes a set of host devices 302, such as servers or similar devices, that each can have a series of network ports 304. Some of these ports can function as "production" ports which connect each host to at least one network switch 306 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 308, for example. At least one of these network ports 304 can host traffic for a guest operating system, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. This "console network" also can be implemented using the same network technology as the "production network," such as Ethernet technology. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management. In some embodiments, the cloud manager 330 or a similar component or system can manage the distribution of mapping information to the various components. In one example, the cloud manager can communicate with a NIC to update configuration or functionality of the NIC, such as to enable the NIC to process certain types of packets.

As discussed, a resource can be shared among multiple users, clients, applications, etc., either concurrently or at different times, with varying levels of access or allocation. In a virtualized environment such as that discussed with respect to the system of FIG. 2, for example, a single physical machine (e.g., server) might host multiple virtual machines. Each of those virtual machines might share a common set of networking resources, such as a network interface card (NIC) and one or more packet queues. When sharing such networking resources, however, a virtual machine that utilizes a disproportionately high amount of network bandwidth, or other such resource allocation, can significantly impact the performance on peer virtual machines sharing that hardware. The impact can result at least in part from the inability of conventional NIC devices and NIC drivers to be able to identify network traffic (e.g., data packets) from disparate virtual machines (VMs) and handle network traffic from these VMs in a way that ensures fairness and preserves latency performance. As a result, when one VM on a physical host generates a heavy network traffic load, the network latency of its peers can be significantly negatively impacted.

Currently, at least in conventional operating systems, the operating system (OS) does not maintain an accurate count of the number of packets outstanding on a NIC, for example, or other information such as how many packets of each VM are outstanding on the NIC, etc. The OS for a VM instead determines whether or not the OS can send a packet, and if so the OS will send the packet and, for the most part, forget about the packet once it is sent. This is in sharp contrast to how block I/O works, where the kernel has knowledge about each I/O packet that is pending. The kernel maintains knowledge because, at least in part, there is no "acknowledge" message received for a packet in the network stack. When a packet is sent, there will be no acknowledgement sent back up the network stack to the kernel indicating that the packet was received and/or transmitted by the NIC or another such component. If there is an error in the transmission, that error typically is handled using a higher level protocol (e.g., TCP) including error recovery mechanisms. At an OS-kernel-network stack level, however, such error handling does not exist. The packet is sent and the transmission is not tracked at that level. Such an approach typically will not be acceptable for block I/O, as the system typically needs to ensure that each I/O that is transmitted actually completes, else there is a timeout to prevent the kernel from waiting indefinitely in a stuck or hung state. Further, the semantics for block I/O are very different from those for network I/O, and there is no visibility into information such as which packets are actually outstanding in the NIC, which packets have been sent, whose packets are pending, etc., due in large part to the network I/O semantics.

In many cases, all network traffic from these virtual machines will VMs pass through a Virtual Machine Manager (VMM) or control domain (e.g., Dom-0). The control domain can utilize network traffic control software that attempts to ensure network traffic fairness and guarantee service-level agreements (SLAs). Unfortunately the control domain network traffic control software (e.g., TC in Linux) is unable to reduce cross-VM latency impact caused by a NIC and the corresponding NIC driver.

A primary cause of cross-VM network latency impact in conventional systems relates to the fact that the network transmit queue in the network device driver and/or in the NIC is fairly large. For example, the queue might vary in size 256 bytes to 4 kilobytes for conventional NICs. As a result, in-transit packets can easily fill a transmit queue for a NIC or NIC driver when a network bandwidth-heavy VM transmits network packets (e.g., each up to 64K in size). When a peer VM transmits network packets, the network packets from a peer VM will be queued for transmission after the outstanding network packets from the network bandwidth-heavy VM, even if the network bandwidth usage for the peer VM is minimal and well under the SLA (and thus should receive a high priority). This can result in a latency impact on the order of, for example, hundreds of milliseconds. A reduction in the queue of a NIC can potentially improve the cross VM latency impact by giving more control of network traffic to the control domain network traffic control software, but can also reduce the overall network performance, particularly network throughput.

Accordingly, systems and methods in accordance with various embodiments can provide for, and utilize, intelligent network traffic control software that is able to improve network latency performance and decrease cross-VM latency impact in a virtualized environment, even if components such as a NIC and an associated NIC driver are unable to provide VM-level quality of service (QoS) or latency guarantees. Approaches in accordance with various embodiments are operable to track pending network packets in the NIC, for example, and identify the originating VM for each of those network packets, such as in standard operating systems such as Linux. Using this information, as well as other such information ordinarily available to the network traffic control software, enables network traffic to be controlled such that cross-VM latency impact can be minimized while remaining in line with various network constraints, such as VM configuration and SLA requirements.

Figure 4:
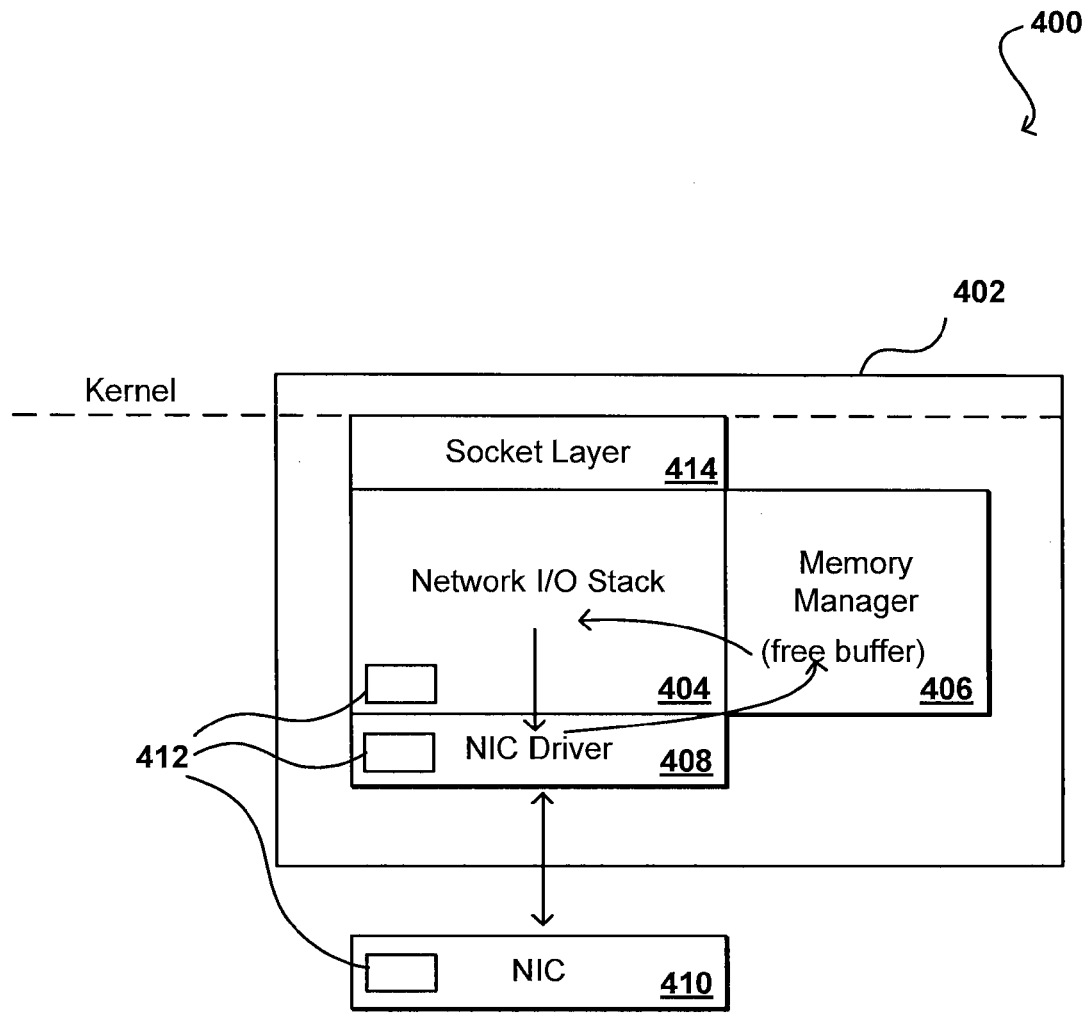
FIG. 4 illustrates an example configuration wherein queue state can be used to infer packet transmission and related information in accordance with various embodiments.

FIG. 4 illustrates an example environment 400 including a selection of components which can be utilized for such purposes in accordance with various embodiments. It should be understood, however, that various additional, fewer, or alternative components can be used as well within the scope of the various embodiments. In this example, the kernel in a virtualized environment can track packets that are outstanding on a NIC 410, as well as an identity of the VM or other source of each packet. As discussed above, such information can be used to intelligently decide when to schedule packets in order to minimize aspects such as cross-VM latency effects on network I/O operations. In order to track packet information in this example, the system can take advantage of information obtained regarding various data buffers 412 that can be included at any appropriate level, such as on the NIC, associated with the NIC driver 404, or as part of the network I/O stack 404. For example, the NIC driver 408 might store one or more data packets in a local buffer until the NIC driver is able to send the packet down to the NIC 410, where the packet can be stored in a local buffer. When the NIC driver transmits the packet, for example, the transmission will result in the buffer having capacity, which in at least some embodiments causes a "free buffer" API call (or similar call or request) to be generated, which indicates that another packet is able to be sent. The "free buffer" API calls, or state of various buffers, for example, are typically not tracked by the network stack 404, such as is the case for the Linux® operating system.

Systems and methods in accordance with various embodiments can take advantage of these API calls to determine when packets have been transmitted, and associate those transmissions with information about the packets, in order to track the transmission of packets for various sources. In this example, one or more "hooks" can be added to the "free buffer" API calls to specify when a particular packet has been sent, connecting the information at the NIC driver with the fact that the NIC actually transmitted a given packet. A hook generally refers to code for altering or augmenting the behavior of a system or application by intercepting calls (e.g., API calls) in order to monitor behavior and/or modify the functionality of an application, system, or other component. In some embodiments, each packet can be "tagged" or otherwise assigned an identifier, such as by using an address of the buffer as an implied index. The hook inside the free buffer API (which can be part of the memory manager 406 of the kernel) call can be called whenever the free buffer API is called, and information such as the buffer information, the address of the buffer, and other such information can enable the network stack to determine that a particular packet has been transmitted.

Looking at the network path inside the kernel in FIG. 4, the socket layer 414 passes packets to the network stack 404, which talks to the NIC driver 408. The network I/O stack can obtain buffers from the memory manager 406 as needed. The buffers with the packet data are essentially passed down to the NIC driver 408 until the NIC driver transmits the data to the NIC 410, at which time the NIC driver 408 sends the memory manager 408 a "free" call indicating that the memory manager can free the buffer. The "free buffer" API call typically does not include much (if any) additional information, and is not sent to the network I/O stack because conventional I/O stacks do not care about the state of the NIC buffer. The hook added to the free buffer API can call a new function in the network I/O stack 404 to indicate to that function that a particular buffer has been freed. That function then can correlate the free buffer information with the packet sent to that buffer in order to determine which packet was (likely) transmitted. Such an approach thus enables the network I/O stack 404 to track of all the packets that it has sent. The network I/O stack also can use this information to determine when those packets were actually sent, as well as the source (e.g., VM) of each packet. By analyzing this information, the network I/O stack can essentially track how many packets from each VM are actually outstanding on the NIC. Such information provides the network stack with information such as the depth of the NIC queue, as well as the source of the packets in the NIC queue.

Once the network stack determines this information, the stack can analyze the information to determine adjustments to improve performance criteria such as latency. For example, the information about a NIC queue can be used to determine the appropriate and/or optimal queue size in order to maximize throughput. In one example, a NIC might typically have a 4K or 8K queue depth, with the depth often measured in terms of packets instead of bytes. Throughput, however, is directly proportional to bytes. Thus, setting a queue depth to handle a smaller number of large packets will typically be sufficient to maintain throughput. The queue may actually allow for a significant number of large packets, however, such that the queue depth could actually be significantly greater than might be set to maximize throughput.

An approach in accordance with one embodiment attempts to determine an appropriate queue depth in terms of bytes such that throughput can be optimized while addressing latency concerns. Once the appropriate queue depth is determined in terms of bytes, the depth to be allocated across the VMs, tenants, applications, or other such entities can be determined in terms of byte count or a combination of byte count and packet count. In some embodiments, a table can be generated that indicates an appropriate number of byes and packets for each queue. Various other mapping approaches can be used to link the byte and packet dimensions in accordance with various embodiments. Once the appropriate counts are determined, an appropriate amount of queue space can be allocated. In some embodiments, the queue for a NIC or NIC driver is treated as a critical resource, and the depth or capacity of the queue can be divided up appropriately among the various VMs or other such sources. The division can be any appropriate division, such as an even distribution or a distribution that is proportions to the SLA for each VM, etc.

In one example, a NIC might be shared between two VMs. If the queue depth that is determined to be optimal for throughput is one million bytes, that value can be divided by the number of VMs and allocated accordingly. If each VM gets half the depth, then each VM in this example will get 500,000 bytes of queue depth. Using this approach, if one of the VMs attempts to transmit a large number of packets, the queue depth setting will limit not only their throughput but also how many bytes can be outstanding on the NIC at any given time based on the allocated queue portion. Such an approach thus not only throttles throughput, but also throttles queue depth corresponding to those VMs. At any given point, the first VM in this example can only have half a million bytes of packets or other groupings of data, although it should be understood that other amounts are possible in other examples. The other VM then can, at most, have to wait for half a million bytes of data to empty out of the queue before the second VM can utilize the NIC. This approach effectively caps the cross-VM latency impact experienced by peer VMs. Without this limit, the first VM could fill up the NIC queue quickly, even if there was a limit on the number of packets that could be sent. Such an approach can be used as a supplement to existing traffic control approaches, and can be used in conjunction with rate limiting where desired.

Figure 5A:
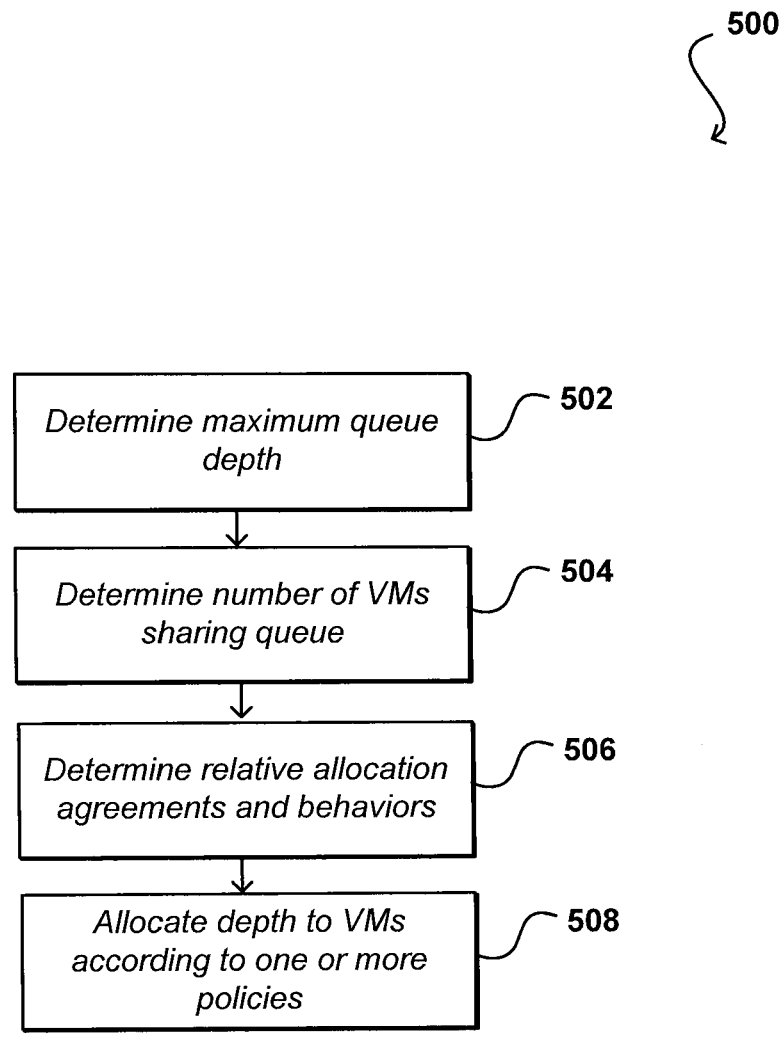
FIGS. 5(a) and 5(b) illustrate portions of an example process for inferring packet transmission and dynamically apportioning access to a shared resource that can be used in accordance with various embodiments.
Figure 5B:
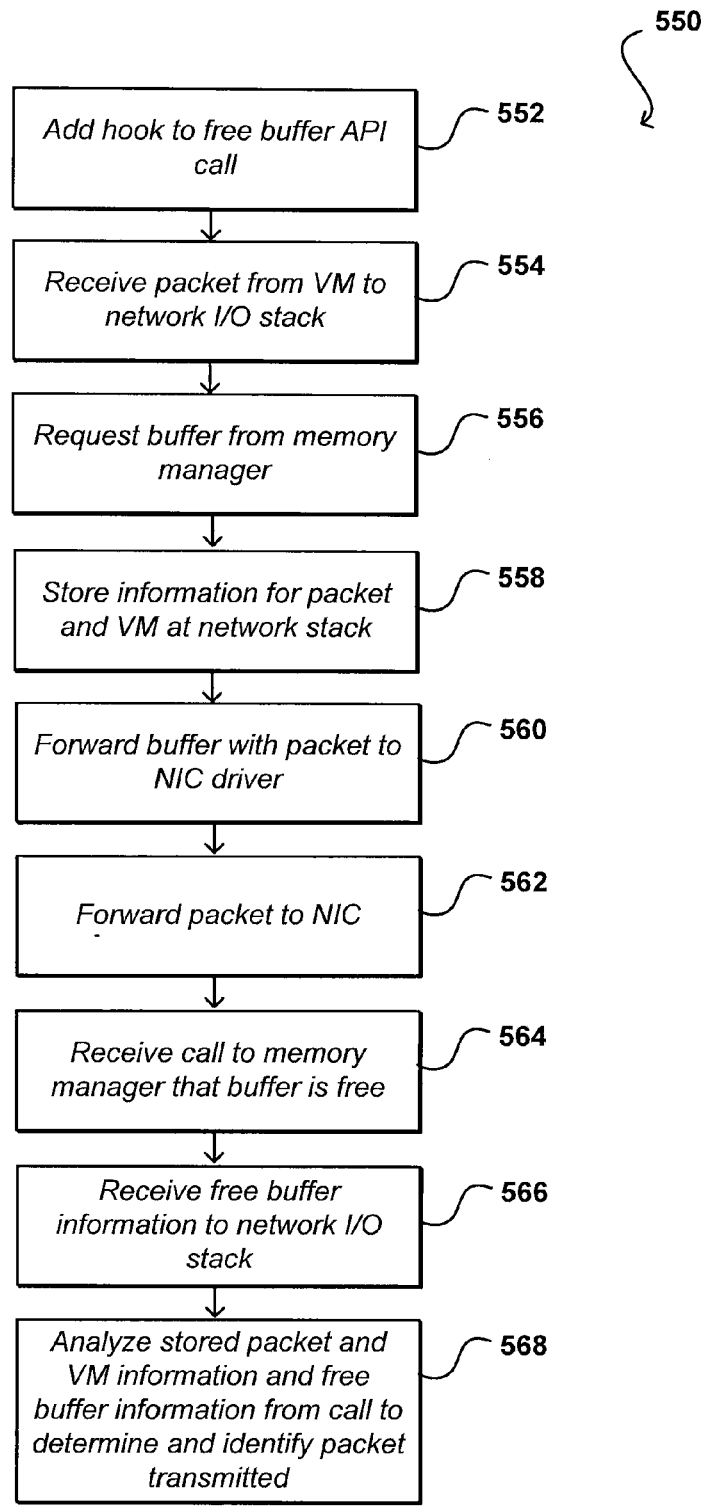

FIGS. 5(a) and 5(b) illustrate portions 500, 550 of an example process for determining, tracking, and/or inferring packet transmission data, and allocating packet transmission capacity, that can be used in accordance with one embodiment. It should be understood, however, that for any process described herein there can be additional, fewer, or alternative steps performed in similar or alternative orders, or in parallel, unless otherwise stated, within the scope of the various embodiments. In the portion of the process illustrated in FIG. 5(a), the system can attempt to allocate and/or throttle resource usage dynamically based at least in part upon aspects such as queue depth and observed behavior. In this example, a maximum queue depth can be determined 502. This can involve, for example, determining how many packets of a given size can be pending in the queue without negatively impacting throughput. In some embodiments, a "profile" can be generated for a queue that contains maximum depth information in terms of both the number of packets and the byte size of those packets. Such a profile can be generated for any queue along the packet flow, such as a queue in the NIC driver or NIC itself. As should be understood, this portion of the process may be performed only once in certain embodiments, such as when a machine is initially configured.

Once the maximum queue depth ("MAX") value is determined, the system can attempt to determine how to allocate, distribute, or apportion the queue depth among the entities sharing the queue. In this example, the number of VMs currently sharing any of these queues can be determined at any appropriate time, such as at regular intervals or upon a detected slow down in the system 504. Any information useful in apportioning the queue depth among the various VMs also can be determined 506, such as by looking at the behavior of each VM, the number of VMs sharing the queue, any SLA requirements, and other such information. Using this information, the system (e.g., a control plane component or module of the network I/O stack) can apply one or more policies or techniques to allocate the queue depth across the VMs 508. As discussed, the relative distributions can be based at least in part upon the behavior of each VM, where that allocation is based at least partially on packets sizes. It should be understood, however, that other allocations can be used as well in accordance with other embodiments. Further, the amount of buffer capacity allocated to each VM can be adjusted over time based upon any number of factors, such as the type, size, and/or amount of packets sent by each VM, as well as other such information.

Once the maximum queue depth is determined and the relative queue sizes distributed between the VMs, the system can begin to process packet flow using a process such as the portion 550 illustrated in FIG. 5(a). In this example, a hook is added to work with at least one type of system call 552, such as a free buffer API call submitted when a buffer for a component (e.g., a NIC or NIC driver) empties, has available space, or otherwise has a change in state. In some embodiments, a hook can be added via an administrator through a control plane as discussed above. Information from the hook in such embodiments can be forwarded to a component of the control plane in addition to any components in the data plane (i.e., in the network I/O stack). Information can be stored to the data store in the control plane for subsequent analysis, such as to determine an optimal queue depth as discussed elsewhere herein. It should be understood that in this example the addition of a hook can be handled once, before packet flow.

Subsequently, the system can process packets from those VMs according to the apportioned depth determined in the process portion of FIG. 5(a). A packet can be received from a source (in one example, one of a plurality of virtual machines sharing a NIC) to the socket layer and then the network I/O stack 554. As should be understood, in many situations there will be a number of packets received to the network stack from each VM sharing the NIC. When the packet is received to the network stack, the stack can request a buffer from the memory manager 556, and can store the packet (or information for the packet) in the buffer, the network stack also storing information identifying the VM associated with the packet 558. In some embodiments, the packet can also be tagged with an appropriate identifier as discussed elsewhere herein, and/or a separate queue can be established by the network traffic control component to store information for the packet, etc. When the NIC driver has capacity to accept the packet information, such as when there is available queue depth for the NIC driver and the packet is scheduled for transmission, the buffer with the packet information can be essentially forwarded to the NIC driver 560.

When the NIC has capacity to accept the packet information, or at any other appropriate time, the packet can be forwarded to the NIC from the NIC driver 562. When the packet is forwarded to the NIC, the NIC driver can send an API call to the memory manager indicating that the buffer that was storing the packet is now free 564. In some embodiments, a call also (or alternatively) can be made from the NIC when the packet is transmitted and the NIC buffer that was storing the packet is now free. The hook can intercept the call(s) and cause information regarding the free buffer to be forwarded to the network I/O stack 566, such as by making a separate call to a network traffic control component, and in some cases forwarded to the control plane either directly or via the network stack. The information regarding the free buffer(s) can be analyzed along with the packet and VM information stored by the network I/O stack in order to infer that a specific packet was transmitted 568, as well as other information such as the identity of the VM that sent the packet, any delay in transmitting the packet, etc. Such information can be used to determine other information as well, such as how many packets each VM has pending, how long the packets for each VM take to transmit, etc.

As discussed above, transmissions of data packets in such an environment typically do not have explicit completion semantics, such that there typically is not callback from the NIC driver to the network traffic control component about the successful transmission of a packet that the network traffic control component transmitted. In order to track pending network packets in general purpose operating systems (e.g., Linux), an additional field can be added in the network packet control structure (e.g., the socket buffer (skb) in Linux) in order to 'tag' the network packets when the packets are submitted by the operating system to the NIC driver. The operating system can maintain a separate transmit queue corresponding to each VM or application. When a packet from a particular VM's queue is submitted to the NIC driver, the packet can, in some embodiments, be tagged with information about the queue from which the packet was submitted, and information about the transmitted packet (e.g., packet count, byte count, and time of transmission) may be recorded. In some embodiments, information such as the address of the skb or the packet structure can be used as a tag for such purposes, as the addition of information to the skb involves a change to the skb which must be managed.

In a specific example applying the method described with respect to FIGS. 5(*a*) and 5(*b*), a NIC driver locks the memory buffers and control structure (e.g., skb in Linux) when submitting a network packet for transmission. When the respective NIC signals to the NIC driver that the NIC is able to receive another packet, the NIC driver can call a standard internal OS function (e.g., skb_free in Linux) of the memory manager to free the buffers and control structure. The act of releasing the memory corresponding to a network packet can be taken as an indirect indication that the packet has been transmitted. The network traffic control can insert a hook into this OS function that releases memory buffers and the control structure, which passes the special tag in the control structure (e.g., skb) to the network traffic control software. The network traffic control software can leverage the tag information to account for a successful packet transmission that might include decrementing packet and byte counters, as well as other functions such as potentially recording the time of determined successful packet transmission. In some embodiments, the inserted hook is able to pass the tag to the network traffic control software via a simple function, via a queue mechanism, or through another appropriate communication mechanism(s). The hook can be in the form of a simple change to the standard OS function or inserted using advanced code insertion techniques, such as high-performance kprobe.

In other embodiments, the unique addresses of memory buffers or the control structure can be used for uniquely identifying packets that are transmitted, instead of using tags as discussed above. Such an approach does not require additional data to be added to the packet control structure, which is an advantage in at least several embodiments, but can potentially present additional overhead in a packet tracking mechanism of the network traffic control software.

In order to decrease cross-VM latency impact in accordance with one embodiment, the minimum network packet transmit queue depth for maintaining line rate throughput is determined. The depth can be determined in terms of the byte count of pending packets or via a count of the pending packets, for example. A maximum (MAX) number of units (e.g., bytes or packets) can be determined, and the system can attempt to maintain the pending transmission queue at or below the MAX number of units, and can allocate the MAX number of units across the peer VMs such that the cross-VM latency impact is minimized. In some cases, the MAX number of units can be set to more than the amount determined above, such as where a goal is to optimize for overall network throughput as opposed to, or example, optimal latency performance.

In an approach in accordance with one embodiment, there are a number (e.g., n) of peer VMs in the physical host that are of normal priorities and/or weights. These priorities and/or weights can typically result in proportional network bandwidth resource allocations that are enforced by the network traffic control software. In order to minimize cross-VM latencies, the MAX unit of pending network traffic can be allocated to the n VMs proportional to their priorities and/or weights, as may be subject to practical adjustments such as allowing at least 64K pending I/O requests in certain cases, etc. The network traffic control software can leverage the information determined by tracking the pending network packets to enforce the per-VM limit on pending network traffic.

Such enforcement can be applied on top of all existing network traffic control techniques, such as absolute network bandwidth throttling, link bandwidth sharing throttling, and the like. If one VM is heavy on network throughput while other peer VMs are idle, such an approach can ensure that the transmit queue is not unfairly loaded by the heavy VM, even if full-link bandwidth sharing is otherwise allowed by the network traffic control. Without this assurance, such a situation can increase the network latency of a peer VM when that VM starts to send network packets.

In an approach in accordance with another embodiment, there can be n VMs in the physical host that have a high priority and m VMs with a low priority, where the m VMs are allowed access to the NIC (or other resource) when the n high priority VMs are idle. The MAX units can be allocated proportionally to the n high priority VMs. The low priority VMs are allowed to transmit packets only when the high priority VMs have nothing to transmit, subject to practical limits. For example, the packets from the low priority VMs might have a log timeout value for transmission, after which the packets could be transmitted even if the high priority VMs continue to send network packets. Such an approach can ensure that the low priority VMs still get access to the shared resource(s) and do not stall or otherwise experience problems. In some embodiments, the low priority VMs are allowed to send only one or a few pending transmit packets at any given time, and this limit can be enforced using information gained from tracking pending network packets. Again such enforcement can be applied on top of all existing network traffic control techniques, such as absolute network bandwidth throttling, link bandwidth sharing throttling, and the like.

As discussed, the queue depth and packet tracking information can be used with other information as well, such as packet prioritization. Headers of packets such as IP packets often include headers that can mark a packet as a high priority packet (e.g., voice data) or a low priority packet (e.g., email) by an OS or other appropriate source, independent of the virtualization system. These header values can be used by the kernel, as well as switches and routers, to prioritize packets appropriately in the presence of contention. It is possible for the virtualization system to utilize those bits as well. Traffic control then can be provided not only at a per VM level, but also within a VM. Priorities also can be extended based on stacking and other such aspects, to provide a better QoS for different types of flows, even from within a single VM.

In some embodiments, the queue sizes can be adjusted dynamically based on information such as observed behavior. For example, if all the peer VMs are acting within set performance guidelines, the depth and throttling values can be relaxed. If a VM starts exceeding any value or guideline based on local or global behavior (e.g., traffic across all instances for a customer in a network cloud), that information can be used to throttle not just the throughput but the queue size allocated to a VM on a dynamic basis as well. If the calculations are correct, and the reactions sufficiently quick, the system should almost never reach the situation where the NIC queue is actually full.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for minimizing latency for high priority virtual machines with respect to low priority virtual machines, comprising:
    under control of one or more computer systems configured with executable instructions,
    determining a maximum queue depth for a queue associated with a network resource, the network resource and associated queue being shared among a plurality of high priority virtual machines and a plurality of low priority virtual machines;
    allocating a portion of the maximum queue depth of the queue to each high priority virtual machine of the plurality of high priority virtual machines, wherein no portion of the queue is allocated to the plurality of low priority virtual machines;
    determining whether one or more of the high priority virtual machines is not utilizing the allocated portion of the maximum queue depth; and
    if one or more of the high priority virtual machines is not utilizing the allocated portion of the maximum queue depth, enabling at least one packet for at least one of the plurality of low priority virtual machines to be transmitted using an unused portion of the allocated portion of the maximum queue depth,
    wherein a determination of whether one or more of the high priority virtual machines is utilizing the allocated portion of the maximum queue depth is based at least in part upon a determination of whether the queue has the capacity to store additional packets, wherein the determination of whether the queue has the capacity to store additional packets is performed by the one or more computer systems.

2. The computer-implemented method of claim 1, further comprising:
    limiting a number of packets that one of the low priority virtual machines is able to have pending at any time based at least in part upon tracking behavior of that low priority virtual machine.

3. The computer-implemented method of claim 1, wherein the maximum queue depth is based at least in part upon a combination of packet size and packet count.

4. The computer-implemented method of claim 1, wherein there are multiple priority levels among the high priority virtual machines, the allocation of the maximum queue depth among the high priority virtual machines being based at least in part upon the relative priority levels.

5. The computer-implemented method of claim 1, wherein low priority virtual machines are able to have packets processed only when one or more of the high priority virtual machines is idle.

6. The computer-implemented method of claim 1, wherein each packet for a low priority virtual machine has a timeout value, the packet configured to be transmitted before the timeout value even if the high priority virtual machines have packets pending.

7. The computer-implemented method of claim 1, wherein each packet for a low priority virtual machine further has a second priority set in a packet header identifying a priority of the packet based on the type of packet.

8. A computer-implemented method for managing packet transmission, comprising:
    under control of one or more computer systems configured with executable instructions,
    receiving a packet from a sending source of a plurality of packet sources sharing access to a transmission component, the transmission component associated with a queue shared by the plurality of packet sources;
    determining whether the sending source is a high priority source or a low priority source, wherein a portion of a determined maximum queue depth of the queue is allocated to each high priority source of the plurality of packet sources, and wherein no portion of the queue is allocated to a low priority source of the plurality of packet sources,
    when the sending source is a high priority source, forwarding the packet to the queue associated with the transmission component;
    otherwise, when the sending source is a low priority source, determining whether there is available capacity in the queue, wherein the packet is sent only if there is available capacity in the queue;
    in response to the packet being removed from the queue, sending a queue state call to a memory manager component, the queue state call causing information regarding the packet being removed from the queue to be transmitted to a control component operable to analyze the information regarding the packet being removed from the queue to infer transmission of the packet by the transmission component; and
    determining whether to throttle the sending source based at least in part upon a determination of whether the queue has the capacity to store additional packets and whether the source is a high priority source or a low priority source, wherein the determination of whether the queue has the capacity to store additional packets is performed by the one or more computer systems.

9. The computer-implemented method of claim 8, wherein cross-packet source latency impact is minimized among the plurality of packet sources.

10. The computer-implemented method of claim 8, further comprising:
    limiting a number of packets that one of the low priority virtual machines is able to have pending at any time based at least in part upon tracking behavior of that low priority virtual machine.

11. The computer-implemented method of claim 8, wherein the maximum queue depth is based at least in part upon a combination of packet size and packet count.

12. The computer-implemented method of claim 8, wherein there are multiple priority levels among the high priority virtual machines, the allocation of the maximum queue depth among the high priority virtual machines being based at least in part upon the relative priority levels.

13. The computer-implemented method of claim 8, wherein low priority virtual machines are able to have packets processed only when one or more of the high priority virtual machines is idle.

14. The computer-implemented method of claim 8, wherein each packet for a low priority virtual machine has a timeout value, the packet configured to be transmitted before the timeout value even if the high priority virtual machines have packets pending.

15. The computer-implemented method of claim 8, wherein determining whether to throttle the sending source is further based at least in part upon any other outstanding packets for the sending source in the queue.

16. The computer-implemented method of claim 8, further comprising:
    monitoring the inferred transmission information for a plurality of packets for the plurality of packet sources in order to determine at least one of a depth of the queue and a relative usage of the queue by each of the plurality of packet sources.

17. The computer-implemented method of claim 16, further comprising:
    setting a current queue depth allocation for the plurality of packet sources based at least in part upon at least one of a determined maximum queue depth and the relative usage of the queue by each of the plurality of packet sources.

18. The computer-implemented method of claim 17, wherein the current queue depth is set based at least in part upon a maximum number of bytes.

19. The computer-implemented method of claim 18, further comprising:
    dynamically adjusting an allocation of the relative portion of the current queue depth for one of the plurality of packet sources based at least in part upon a change in the relative usage of the queue by the packet source.

20. A system for minimizing latency for high priority virtual machines with respect to low priority virtual machines, comprising:
    a processor; and
    a memory device including instructions that, when executed by the processor, cause the system to:
    determine a maximum queue depth for a queue associated with a network resource, the network resource and associated queue being shared among a plurality of high priority virtual machines and a plurality of low priority virtual machines;
    allocate a portion of the maximum queue depth of the queue to each high priority virtual machine of the plurality of high priority virtual machines, wherein no portion of the queue is allocated to the plurality of low priority virtual machines;
    determine whether one or more of the high priority virtual machines is not utilizing the allocated portion of the maximum queue depth; and
    if one or more of the high priority virtual machines is not utilizing the allocated portion of the maximum queue depth, enable at least one packet for at least one of the plurality of low priority virtual machines to be transmitted using an unused portion of the allocated portion of the maximum queue depth,
    wherein a determination of whether one or more of the high priority virtual machines is utilizing the allocated portion of the maximum queue depth is based at least in part upon a determination of whether the queue has the capacity to store additional packets, wherein the determination of whether the queue has the capacity to store additional packets is performed by the system.

21. The system of claim 20, wherein the instructions when executed further cause the system to:
    limit a number of packets that one of the low priority virtual machines is able to have pending at any time based at least in part upon tracking behavior of that low priority virtual machine.

22. The system of claim 20, wherein there are multiple priority levels among the high priority virtual machines, the allocation of the maximum queue depth among the high priority virtual machines being based at least in part upon the relative priority levels.

23. The system of claim 20, wherein each packet for a low priority virtual machine has a timeout value, the packet configured to be transmitted before the timeout value even if the high priority virtual machines have packets pending.

24. A non-transitory computer readable storage medium storing instructions for minimizing latency for high priority virtual machines with respect to low priority virtual machines, the instructions when executed by a processor causing the processor to:
    determine a maximum queue depth for a queue associated with a network resource, the network resource and associated queue being shared among a plurality of high priority virtual machines and a plurality of low priority virtual machines;
    allocate a portion of the maximum queue depth of the queue to each high priority virtual machine of the plurality of high priority virtual machines, wherein no portion of the queue is allocated to the plurality of low priority virtual machines;
    determine whether one or more of the high priority virtual machines is not utilizing the allocated portion of the maximum queue depth; and
    if one or more of the high priority virtual machines is not utilizing the allocated portion of the maximum queue depth, enable at least one packet for at least one of the plurality of low priority virtual machines to be transmitted using an unused portion of the allocated portion of the maximum queue depth,
    wherein a determination of whether one or more of the high priority virtual machines is utilizing the allocated portion of the maximum queue depth is based at least in part upon a determination of whether the queue has the capacity to store additional packets, wherein the determination of whether the queue has the capacity to store additional packets is performed by the processor.

25. The non-transitory computer readable storage medium of claim 24, wherein the instructions when executed further cause the system to:
    limit a number of packets that one of the low priority virtual machines is able to have pending at any time based at least in part upon tracking behavior of that low priority virtual machine.

* * * * *